(12) United States Patent
Ma (10) Patent No.: US 10,991,327 B2
(45) Date of Patent: Apr. 27, 2021

(54) METHOD OF DRIVING PIXEL ARRANGEMENT STRUCTURE AND DISPLAY PANEL AND DISPLAY APPARATUS ASSOCIATED THEREWITH

(71) Applicants: ORDOS YUANSHENG OPTOELECTRONICS CO., LTD., Ordos (CN); BOE TECHNOLOGY GROUP CO., LTD., Beijing (CN)

(72) Inventor: Mingchao Ma, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/649,643

(22) PCT Filed: May 21, 2019

(86) PCT No.: PCT/CN2019/087671
§ 371 (c)(1),
(2) Date: Mar. 21, 2020

(87) PCT Pub. No.: WO2019/223663
PCT Pub. Date: Nov. 28, 2019

(65) Prior Publication Data
US 2020/0258460 A1 Aug. 13, 2020

(30) Foreign Application Priority Data

May 22, 2018 (CN) .......................... 201810494618.6

(51) Int. Cl.
*G09G 3/36* (2006.01)
*G02F 1/1362* (2006.01)

(52) U.S. Cl.
CPC ..... *G09G 3/3614* (2013.01); *G02F 1/136286* (2013.01); *G09G 3/3607* (2013.01); *G09G 2320/0223* (2013.01)

(58) Field of Classification Search
CPC .............. G09G 3/3607; G09G 3/3614; G09G 2300/0452; G09G 2320/0223; G09G 3/3648; G02F 1/136286
See application file for complete search history.

(56) References Cited

U.S. PATENT DOCUMENTS

2015/0348481 A1   12/2015 Hong et al.
2016/0189641 A1    6/2016 Son et al.
(Continued)

FOREIGN PATENT DOCUMENTS

CN   105139813 A   12/2015
CN   105182638 A   12/2015
(Continued)

OTHER PUBLICATIONS

First Office Action and English language translation, CN Application No. 201810494618.6, dated Feb. 3, 2020, 10 pp.

*Primary Examiner* — Kwang-Su Yang
(74) *Attorney, Agent, or Firm* — Myers Bigel, P.A.

(57) ABSTRACT

A pixel arrangement structure includes a plurality of pixel repeating units arranged in a matrix in a row direction and a column direction. Each of the plurality of pixel repeating units includes a first pixel unit and a second pixel unit sequentially arranged in the column direction. The first pixel unit includes a first sub-pixel, a second sub-pixel, a third sub-pixel, and a fourth sub-pixel which are sequentially arranged in the row direction. The second pixel unit includes a third sub-pixel, a fourth sub-pixel, a first sub-pixel, and a second sub-pixel which are sequentially arranged in the row direction. Each column of sub-pixels is divided into a first (Continued)

subset of sub-pixels connected to a first data line and a second subset of sub-pixels connected to a second data line.

11 Claims, 7 Drawing Sheets

(56) References Cited

U.S. PATENT DOCUMENTS

| | | | |
|---|---|---|---|
| 2017/0221436 A1* | 8/2017 | Guo | G09G 3/3607 |
| 2018/0137829 A1 | 5/2018 | Mok et al. | |
| 2018/0158431 A1* | 6/2018 | Fujikawa | G09G 3/3677 |
| 2018/0190216 A1 | 7/2018 | Wang et al. | |
| 2018/0261180 A1* | 9/2018 | Zhou | G09G 3/3688 |
| 2019/0088185 A1* | 3/2019 | Zhang | H01L 27/1214 |
| 2019/0088218 A1 | 3/2019 | Chen et al. | |
| 2020/0258460 A1 | 8/2020 | Ma | |
| 2020/0320943 A1* | 10/2020 | Huang | G09G 3/3607 |

FOREIGN PATENT DOCUMENTS

| | | |
|---|---|---|
| CN | 105741799 A | 7/2016 |
| CN | 105892182 A | 8/2016 |
| CN | 108761938 A | 11/2018 |

* cited by examiner (Related Art)

METHOD OF DRIVING PIXEL ARRANGEMENT STRUCTURE AND DISPLAY PANEL AND DISPLAY APPARATUS ASSOCIATED THEREWITH

CROSS REFERENCE TO RELATED APPLICATIONS

The present application is a 35 U.S.C. 371 national stage application of PCT International Application No. PCT/CN2019/087671, filed on May 21, 2019, which claims the benefit of Chinese Patent Application No. 201810494618.6, filed on May 22, 2018, the entire disclosures of which are incorporated herein by reference.

TECHNICAL FIELD

The present disclosure relates to the field of display technology, and in particular, to a pixel arrangement structure, a method of driving the pixel arrangement structure, a display panel, and a display apparatus.

BACKGROUND

Thin film transistor liquid crystal displays (TFT-LCDs) are widely used in mobile products such as mobile phones and tablet computers. In order to meet the demand for high brightness, various pixel arrangement structures have been proposed, among which is the so-called RGBW (Red, Green, Blue, and White). In such a pixel arrangement structure, the brightness of a display can be significantly improved when white sub-pixels are lit.

SUMMARY

According to some embodiments of the present disclosure, a pixel arrangement structure is provided, comprising: a plurality of pixel repeating units arranged in a matrix in a row direction and a column direction, each of the plurality of pixel repeating units comprising a first pixel unit and a second pixel unit sequentially arranged in the column direction, the first pixel unit comprising a first sub-pixel, a second sub-pixel, a third sub-pixel, and a fourth sub-pixel sequentially arranged in the row direction, and the second pixel unit comprising a third sub-pixel, a fourth sub-pixel, a first sub-pixel, and a second sub-pixel sequentially arranged in the row direction; and a plurality of data lines extending in the column direction. The first sub-pixel in a $(4m+1)$-th row and a $(4n+1)$-th column, the third sub-pixel in a $(4m+2)$-th row and the $(4n+1)$-th column, the second sub-pixel in a $(4m+3)$-th row and a $(4n+2)$-th column, and the fourth sub-pixel in a $(4m+4)$-th row and the $(4n+2)$-th column are connected to a $(4n+1)$-th one of the plurality of data lines. The second sub-pixel in the $(4m+1)$-th row and the $(4n+2)$-th column, the fourth sub-pixel in the $(4m+2)$-th row and the $(4n+2)$-th column, the third sub-pixel in the $(4m+3)$-th row and a $(4n+3)$-th column, and the first sub-pixel in the $(4m+4)$-th row and the $(4n+3)$-th column are connected to a $(4n+2)$-th one of the plurality of data lines. The third sub-pixel in the $(4m+1)$-th row and the $(4n+3)$-th column, the first sub-pixel in the $(4m+2)$-th row and the $(4n+3)$-th column, the fourth sub-pixel in the $(4m+3)$-th row and a $(4n+4)$-th column, and the second sub-pixel in the $(4m+4)$-th row and the $(4n+3)$-th column are connected to a $(4n+3)$-th one of the plurality of data lines. The fourth sub-pixel in the $(4m+1)$-th row and the $(4n+4)$-th column, the second sub-pixel in the $(4m+2)$-th row and the $(4n+4)$-th column, the first sub-pixel in the $(4m+3)$-th row and a $(4n+5)$-th column, and the third sub-pixel in the $(4m+4)$-th row and the $(4n+5)$-th column are connected to a $(4n+4)$-th one of the plurality of data lines. m and n are integers greater than or equal to 0.

In some embodiments, the first sub-pixel, the second sub-pixel, the third sub-pixel, and the fourth sub-pixel are respective different ones selected from a red sub-pixel, a green sub-pixel, a blue sub-pixel, and a white sub-pixel.

According to some embodiments of the present disclosure, a method of driving the pixel arrangement structure as described above is provided. The method comprises applying respective data voltages to the data lines in a frame period, such that any two pixel repeating units adjacent in the row direction have opposite data voltage polarity patterns.

In some embodiments, the sub-pixels in a $(4i+1)$-th row and $(8j+1)$-th to $(8j+4)$-th columns respectively have data voltages of the following polarities: a first polarity, a second polarity, a second polarity, and a first polarity. The sub-pixels in a $(4i+2)$-th row and the $(8j+1)$-th to $(8j+4)$-th columns respectively have data voltages of the following polarities: a first polarity, a second polarity, a second polarity, and a first polarity. The sub-pixels in a $(4i+3)$-th row and the $(8j+1)$-th to $(8j+4)$-th columns respectively have data voltages of the following polarities: a second polarity, a first polarity, a second polarity, and a second polarity. The sub-pixels in a $(4i+4)$-th row and the $(8j+1)$-th to $(8j+4)$-th columns respectively have data voltages of the following polarities: a second polarity, a first polarity, a second polarity, and a second polarity. i and j are integers greater than or equal to 0, $i \leq m$, and $j \leq n/2$.

In some embodiments, the sub-pixels in a $(4i+1)$-th row and $(8j+1)$-th to $(8j+4)$-th columns respectively have data voltages of the following polarities: a first polarity, a first polarity, a second polarity, and a first polarity. The sub-pixels in a $(4i+2)$-th row and the $(8j+1)$-th to $(8j+4)$-th columns respectively have data voltages of the following polarities: a first polarity, a first polarity, a second polarity, and a first polarity. The sub-pixels in a $(4i+3)$-th row and the $(8j+1)$-th to $(8j+4)$-th columns respectively have data voltages of the following polarities: a second polarity, a first polarity, a first polarity, and a second polarity. The sub-pixels in a $(4i+4)$-th row and the $(8j+1)$-th to $(8j+4)$-th columns respectively have data voltages of the following polarities: a second polarity, a first polarity, a first polarity, and a second polarity. i and j are integers greater than or equal to 0, $i \leq m$, and $j \leq n/2$.

In some embodiments, the first polarity and the second polarity are respective different polarities selected from a positive polarity and a negative polarity.

According to some embodiments of the present disclosure, a display panel is provided comprising the pixel arrangement structure as described above.

In some embodiments, the display panel further comprises a plurality of data selectors located at the same end of the plurality of data lines and configured to transmit data voltages to respective ones of the plurality of data lines.

In some embodiments, the plurality of data selectors comprise a plurality of three-to-one data selectors, and each of the three-to-one data selectors comprises a data input terminal and three data output terminals.

In some embodiments, the three data output terminals of a $(8k+1)$-th one of the plurality of three-to-one data selectors are respectively connected to $(24k+1)$-th, $(24k+4)$-th and $(24k+6)$-th ones of the plurality of data lines. The three data output terminals of a $(8k+2)$-th one of the plurality of three-to-one data selectors are respectively connected to (24k+2)-th, (24k+3)-th and (24k+5)-th ones of the plurality of data lines. The three data output terminals of a (8k+3)-th one of the plurality of three-to-one data selectors are respectively connected to (24k+7)-th, (24k+9)-th and (24k+12)-th ones of the plurality of data lines. The three data output terminals of a (8k+4)-th one of the plurality of three-to-one data selectors are respectively connected to (24k+8)-th, (24k+10)-th and (24k+11)-th ones of the plurality of data lines. The three data output terminals of a (8k+5)-th one of the plurality of three-to-one data selectors are respectively connected to (24k+13)-th, (24k+16)-th and (24k+18)-th ones of the plurality of data lines. The three data output terminals of a (8k+6)-th one of the plurality of three-to-one data selectors are respectively connected to (24k+14)-th, (24k+15)-th and (24k+17)-th ones of the plurality of data lines. The three data output terminals of a (8k+7)-th one of the plurality of three-to-one data selectors are respectively connected to (24k+19)-th, (24k+21)-th and (24k+24)-th ones of the plurality of data lines. The three data output terminals of a (8k+8)-th one of the plurality of three-to-one data selectors are respectively connected to (24k+20)-th, (24k+22)-th and (24k+23)-th ones of the plurality of data lines. k is an integer greater than or equal to 0, and $k \leq (n-5)/6$.

In some embodiments, the data input terminals of the (8k+1)-th, (8k+3)-th, (8k+6)-th and (8k+8)-th ones of the plurality of three-to-one data selectors are configured to receive data voltages of a first polarity in a frame period. The data input terminals of the (8k+2)-th, (8k+4)-th, (8k+5)-th and (8k+7)-th ones of the plurality of three-to-one data selectors are configured to receive data voltages of a second polarity in the frame period. The second polarity is opposite to the first polarity.

In some embodiments, the plurality of data selectors comprise a plurality of four-to-one data selectors, and each of the four-to-one data selectors comprises a data input terminal and four data output terminals.

In some embodiments, the four data output terminals of a (2k+1)-th one of the plurality of four-to-one data selectors are respectively connected to (8k+1)-th, (8k+4)-th, (8k+6)-th and (8k+7)-th ones of the plurality of data lines. The four data output terminals of a (2k+2)-th one of the plurality of four-to-one data selectors are respectively connected to (8k+2)-th, (8k+3)-th, (8k+5)-th and (8k+8)-th ones of the plurality of data lines. k is an integer greater than or equal to 0, and $k \leq (n-1)/2$.

In some embodiments, the data input terminal of the (2k+1)-th one of the plurality of four-to-one data selectors is configured to receive data voltages of a first polarity in a frame period. The data input terminal of the (2k+2)-th one of the plurality of four-to-one data selectors is configured to receive data voltages of a second polarity in the frame period. The second polarity is opposite to the first polarity.

According to some embodiments of the present disclosure, a display apparatus is provided comprising the display panel as described above.

DETAILED DESCRIPTION

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present disclosure.

Spatially relative terms, such as "row", "column", "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both orientations of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein can be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be interpreted as being limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the relevant art and/or the context of the present specification and will not be interpreted in an idealized or overly formal sense unless expressly so defined herein.

Figure 1:
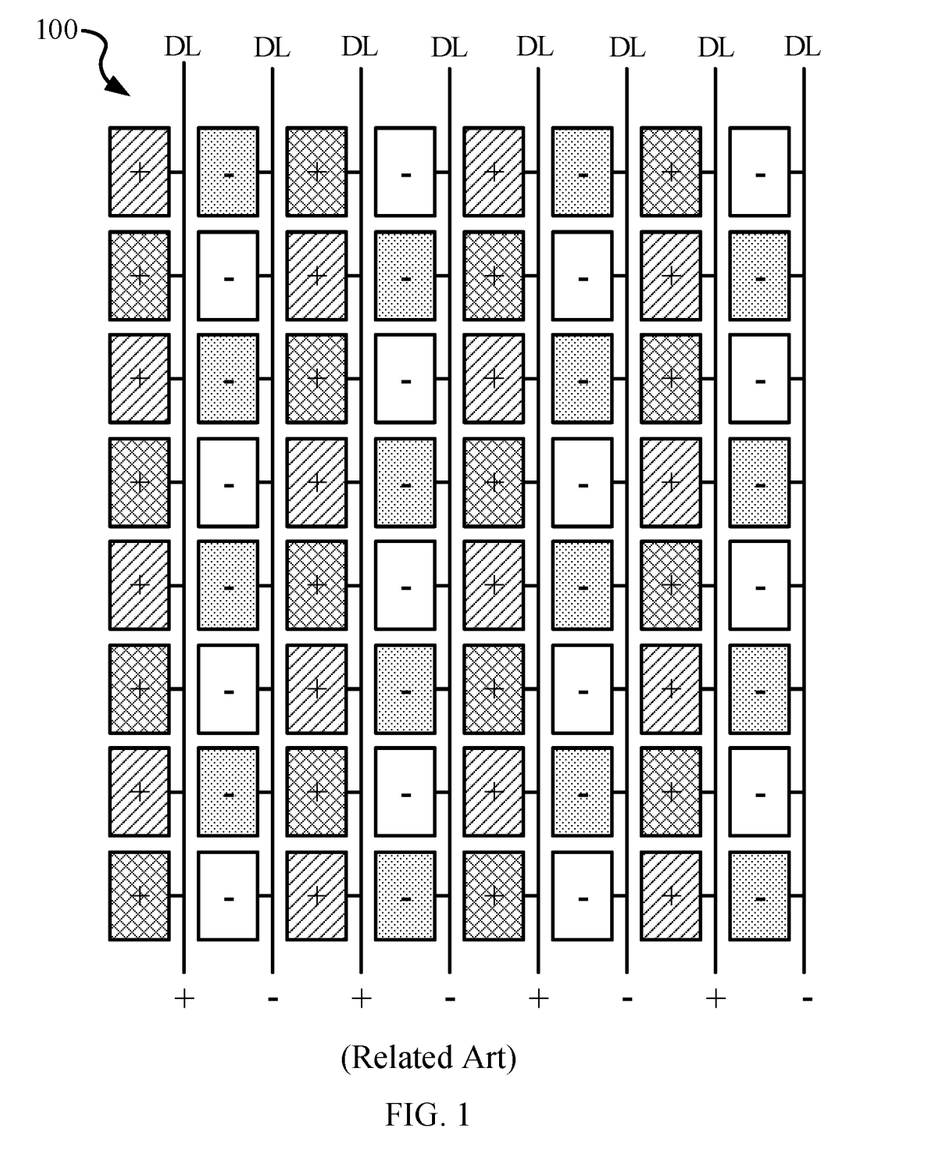
FIG. 1 is a schematic plan view of a pixel arrangement structure in the related art.

FIG. 1 illustrates a pixel arrangement structure 100 in the related art.

Referring to FIG. 1, the pixel arrangement structure 100 includes a plurality of sub-pixels (more specifically, pixel electrodes) arranged in rows and columns, and sub-pixels of different columns are connected to respective different data lines DL. When a frame of picture is displayed, data voltages of the same polarity are applied to the same column of sub-pixels through a respective one of the data lines DL. This may induce a coupling voltage of a single polarity on a common electrode (not shown), resulting in a polarity pattern as shown in FIG. 1. As a result, display defects ("mura") such as vertical lines may occur if the RC loading of the common electrode is large or the induced coupling voltage has a large magnitude.

Figure 2:
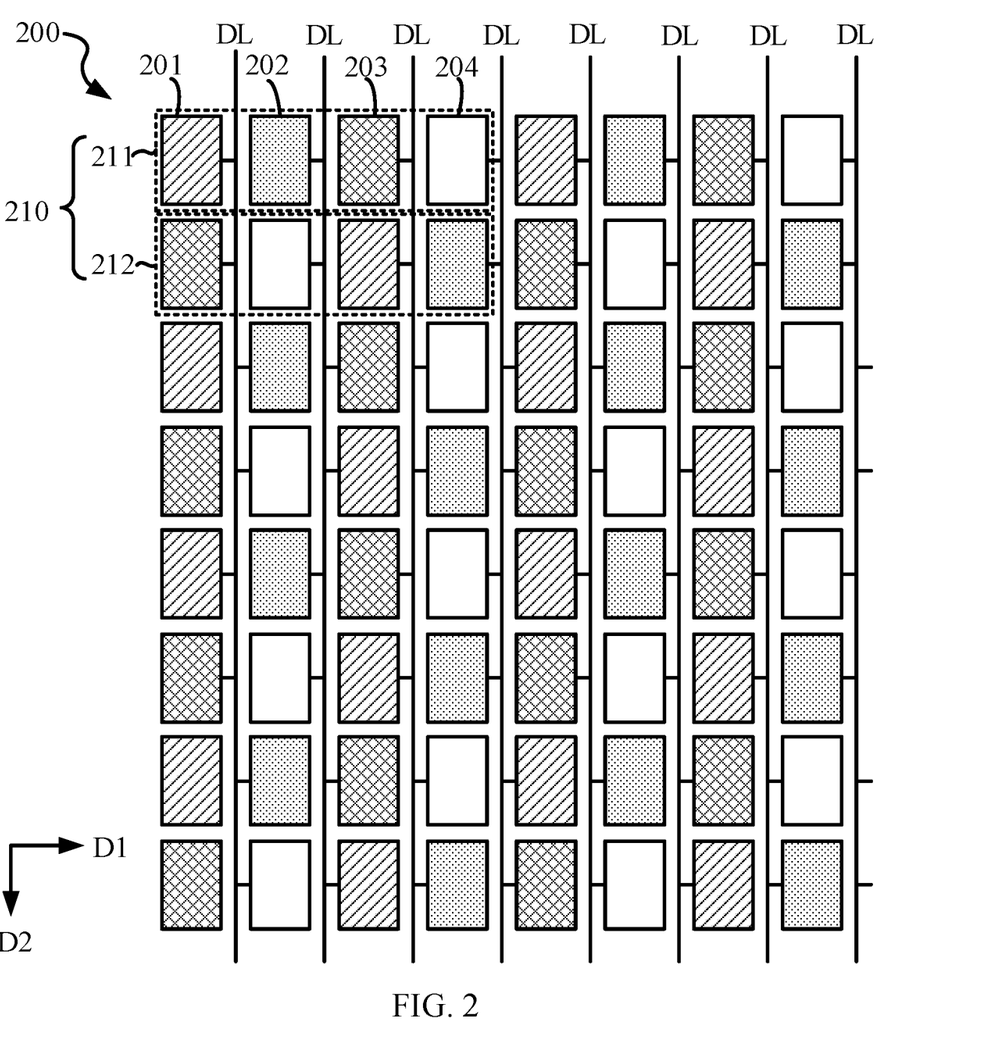
FIG. 2 is a schematic plan view of a pixel arrangement structure according to an embodiment of the present disclosure.

FIG. 2 is a schematic plan view of a pixel arrangement structure 200 according to an embodiment of the present disclosure.

Referring to FIG. 2, the pixel arrangement structure 200 includes a plurality of pixel repeating units 210 arranged in a matrix in a row direction D1 and a column direction D2. Each of the pixel repeating units 210 includes a first pixel unit 211 and a second pixel unit 212 arranged in the column direction D2.

The first pixel unit 211 includes a first sub-pixel 201, a second sub-pixel 202, a third sub-pixel 203, and a fourth sub-pixel 204 that are sequentially arranged in the row direction D1. The second pixel unit 212 includes a third sub-pixel 203, a fourth sub-pixel 204, a first sub-pixel 201, and a second sub-pixel 202 that are sequentially arranged in the row direction D1.

The first, second, third, and fourth sub-pixels 201, 202, 203, and 204 are respective different ones selected from a red sub-pixel, a green sub-pixel, a blue sub-pixel, and a white sub-pixel. For example, the first, second, third, and fourth sub-pixels 201, 202, 203, and 204 are a red sub-pixel (R), a green sub-pixel (G), a blue sub-pixel (B), and a white sub-pixel (W), respectively.

Unlike the pixel arrangement structure 100 of FIG. 1, each column of sub-pixels in the pixel arrangement structure 200 is divided into a first subset of sub-pixels connected to a first data line and a second subset of sub-pixels connected to a second data line, with the first subset of sub-pixels including a (4k+1)-th one and a (4k+2)-th one of the column of sub-pixels, and the second subset of sub-pixels including a (4k+3)-th one and a (4k+4)-th one of the column of sub-pixels (k being an integer greater than or equal to 0). Moreover, the first subset of the sub-pixels in a (k+1)-th column of sub-pixels and the second subset of sub-pixels in a (k+2)-th column of sub-pixels share the same data line.

Specifically, the first sub-pixel in a (4m+1)-th row and a (4n+1)-th column, the third sub-pixel in a (4m+2)-th row and the (4n+1)-th column, the second sub-pixel in a (4m+3)-th row and a (4n+2)-th column, and the fourth sub-pixel in a (4m+4)-th row and the (4n+2)-th column are connected to the (4n+1)-th data line (m and n being integers greater than or equal to 0). The second sub-pixel in the (4m+1)-th row and the (4n+2)-th column, the fourth sub-pixel in the (4m+2)-th row and the (4n+2)-th column, the third pixel in the (4m+3)-th row and a (4n+3)-th column, and the first sub-pixel in the (4m+4)-th row and the (4n+3)-th column are connected to the (4n+2)-th data line. The third sub-pixel in the (4m+1)-th row and the (4n+3)-th column, the first sub-pixel in the (4m+2)-th row and the (4n+3)-th column, the fourth sub-pixel in the (4m+3)-th row and a (4n+4)-th column, and the second sub-pixel in the (4m+4)-th row and the (4n+4)-th column are connected to the (4n+3)-th data line. The fourth sub-pixel in the (4m+1)-th row and the (4n+4)-th column, the second sub-pixel in the (4m+2)-th row and the (4n+4)-th column, the first sub-pixel in the (4m+3)-th row and a (4n+5)-th column, and the third sub-pixel in the (4m+4)-th row and the (4n+5)-th column are connected to the (4n+4)-th data line.

It will be understood that only a partial area of the pixel arrangement structure 200 is schematically shown in FIG. 2, and that other known elements, such as gate lines extending in the row direction D1, pixel transistors located at the intersections of the gate lines and the data lines, and storage capacitors associated with corresponding sub-pixels, are not shown for convenience of illustration. As such, an individual sub-pixel shown in FIG. 2 is not intended to represent a complete sub-pixel structure, but may be considered as a respective pixel electrode, for example. Although an individual sub-pixel is shown as being directly connected to a corresponding data line, this is only schematic, since in fact each sub-pixel will be connected to a corresponding data line via a respective pixel transistor. In addition, the second subset of sub-pixels in the leftmost column of sub-pixels is shown as not connected to any data lines, but that second subset of sub-pixels is actually connected to an additional data line (not shown).

The connection between the sub-pixels and the data lines shown in FIG. 2 may be referred to as a so-called 2H Zigzag connection, where each data line is alternately connected to respective two adjacent columns of sub-pixels at an interval of two horizontal periods. As will be further described later, this allows a column of sub-pixels to have data voltage polarities that alternate at an interval of two horizontal periods, thereby alleviating or eliminating display defects as caused by the polarity pattern of FIG. 1.

Figure 3:
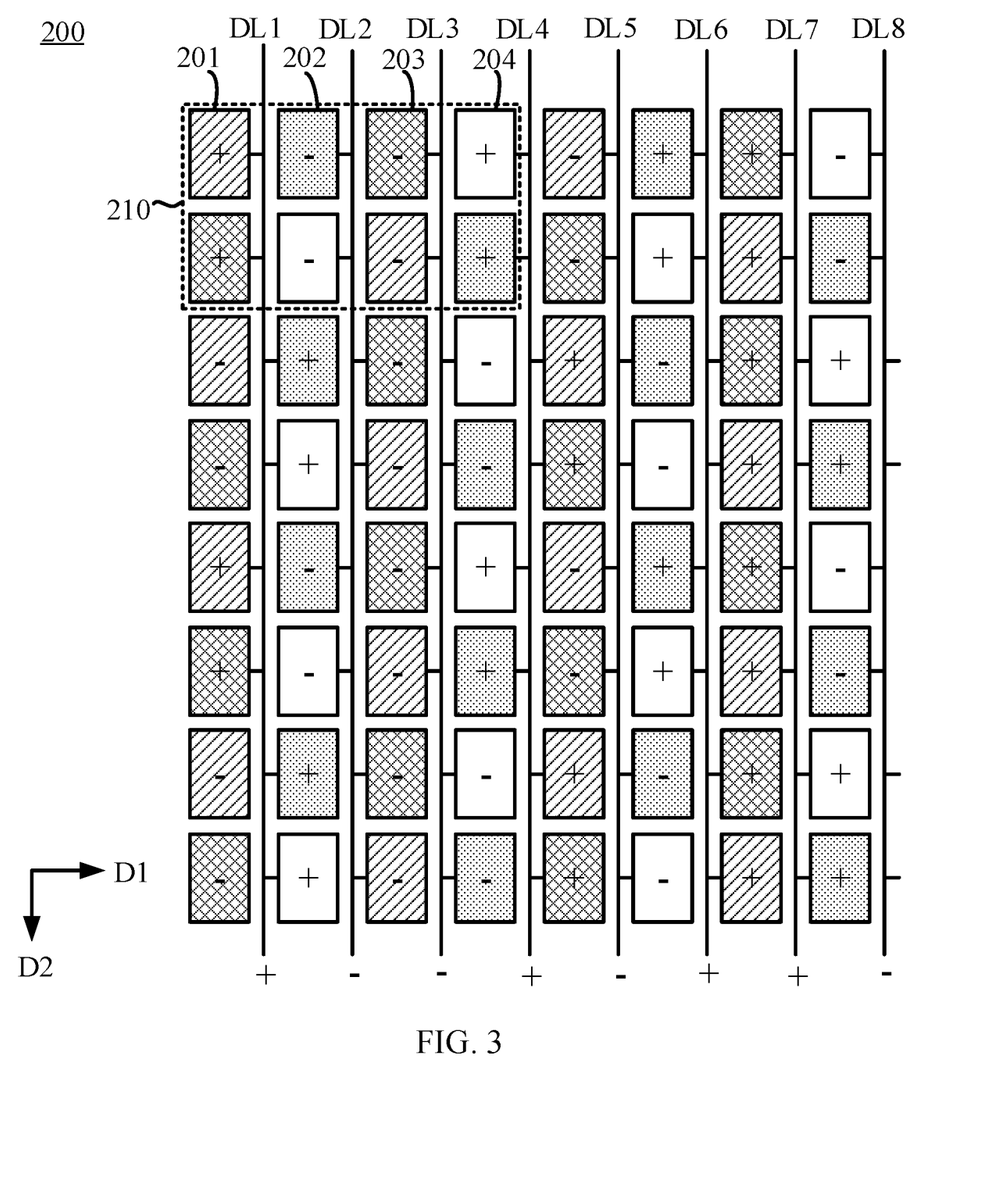
FIG. 3 is an example polarity pattern for the pixel arrangement structure of FIG. 2.

FIG. 3 illustrates an example polarity pattern for the pixel arrangement structure 200 of FIG. 2.

Referring to FIG. 3, respective data voltages are applied to the data lines DL1 to DL8 in a frame period, such that any two pixel repeating units 210 adjacent in the row direction D1 have opposite data voltages in the polarity pattern.

Specifically, the sub-pixels in a (4i+1)-th row and (8j+1)-th to (8j+4)-th columns (i and j being integers greater than or equal to 0, $i \leq m$, $j \leq n/2$) respectively have data voltages of the following polarities: a first polarity, a second polarity, a second polarity, and a first polarity. The sub-pixels in a (4i+2)-th row and the (8j+1)-th to (8j+4)-th columns respectively have data voltages of the following polarities: a first polarity, a second polarity, a second polarity, and a first polarity. The sub-pixels in a (4i+3)-th row and the (8j+1)-th to (8j+4)-th columns respectively have data voltages of the following polarities: a second polarity, a first polarity, a second polarity, and a second polarity. The sub-pixels in a (4i+4)-th row and the (8j+1)-th to (8j+4)-th columns respectively have data voltages of the following polarities: a second polarity, a first polarity, a second polarity, and a second polarity.

The example polarity pattern shown in FIG. 3 can be achieved by applying respectively data voltages of the following polarities to the data lines DL1 to DL8: a positive polarity, a negative polarity, a negative polarity, a positive polarity, a negative polarity, a positive polarity, a positive polarity, and a negative polarity. It will be understood that in a so-called frame inversion mode, a positive polarity is switched to a negative polarity in the next frame period, and vice versa. In this example, the data voltage polarities of each column of sub-pixels (except the third and seventh columns of sub-pixels) are alternated at an interval of two horizontal periods. Moreover, the data voltage polarities of every two sub-pixels adjacent in the row direction D1 are also opposite to each other as much as possible. This facilitates cancellation of the coupling voltages on the common electrode caused by the data voltages on different sub-pixels, thereby alleviating or eliminating display defects.

In some embodiments, a first sub-pixel 201 which is a red sub-pixel and a third sub-pixel 203 which is a blue sub-pixel may be disposed in the third column (more generally, the (8j+3)-th column) of sub-pixels and the seventh column (more generally, the (8j+7)-th column) of sub-pixels, in view of the fact that human eyes are less sensitive to red and blue as compared to green and white. In this way, no perceptible display defects will be brought about even if these columns of sub-pixels have data voltage polarities that do not alternate.

Figure 4:
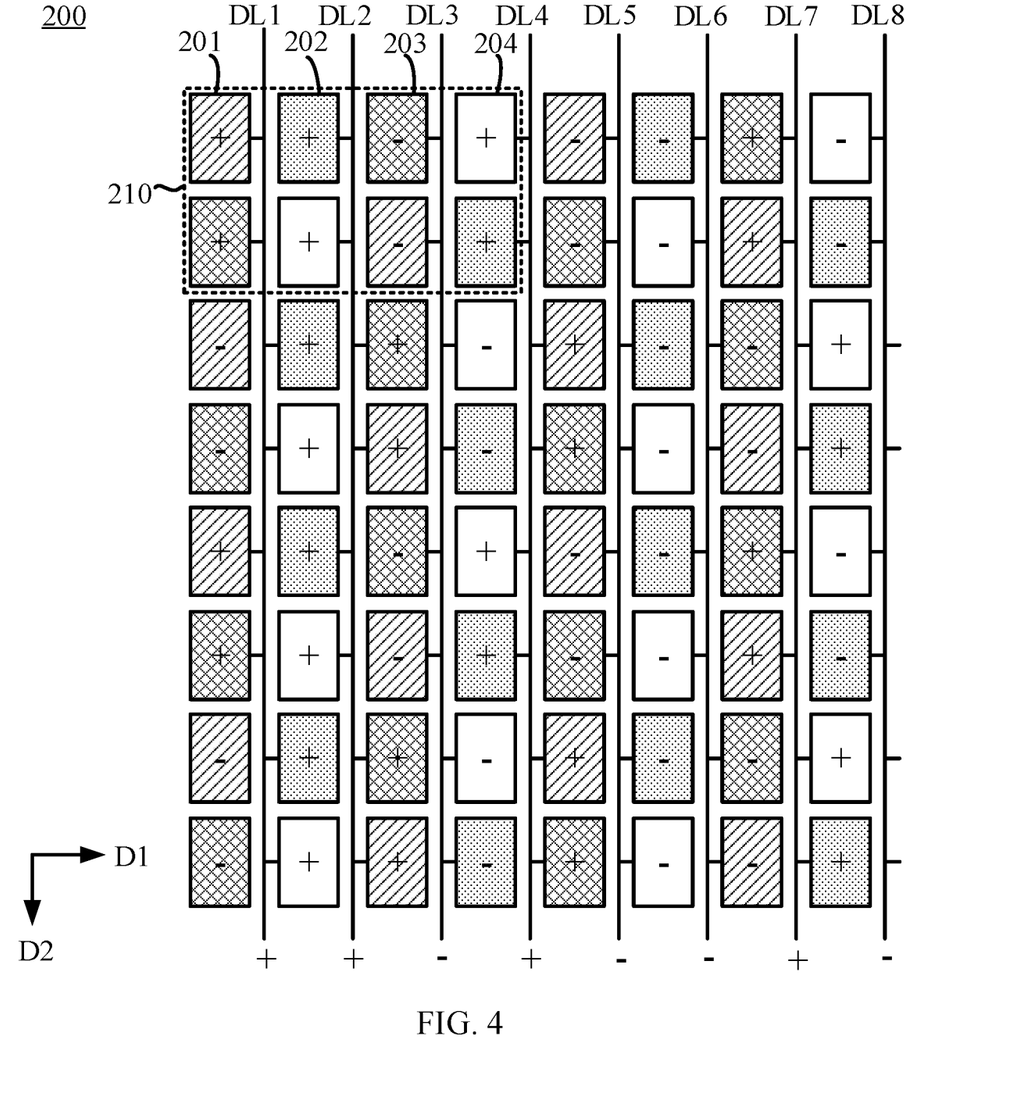
FIG. 4 is another example polarity pattern for the pixel arrangement structure of FIG. 2.

FIG. 4 illustrates another example polarity pattern for the pixel arrangement structure 200 of FIG. 2.

Referring to FIG. 4, the polarity pattern illustrated (which is different from the polarity pattern of FIG. 3) is achieved by applying respectively data voltages of the following polarities to the data lines DL1 to DL8: a positive polarity, a positive polarity, a negative polarity, a positive polarity, a negative polarity, a negative polarity, a positive polarity, and a negative polarity. It will be understood that in a so-called frame inversion mode, a positive polarity is switched to a negative polarity in the next frame period, and vice versa.

More generally, the sub-pixels in a (4i+1)-th row and (8j+1)-th to (8j+4)-th columns (i and j being integers greater than or equal to 0, i≤m, j≤n/2) respectively have data voltages of the following polarities: a first polarity, a first polarity, a second polarity, and a first polarity. The sub-pixels in a (4i+2)-th row and the (8j+1)-th to (8j+4)-th columns respectively have data voltages of the following polarities: a first polarity, a first polarity, a second polarity, and a first polarity. The sub-pixels in a (4i+3)-th row and the (8j+1)-th to (8j+4)-th columns respectively have data voltages of the following polarities: a second polarity, a first polarity, a first polarity, and a second polarity. The sub-pixels in a (4i+4)-th row and the (8j+1)-th to (8j+4)-th columns respectively have data voltages of the following polarities: a second polarity, a first polarity, a first polarity, and a second polarity.

In the example of FIG. 4, the data voltage polarities of each column of sub-pixels (except the second and sixth columns of sub-pixels) alternate at an interval of two horizontal periods. Moreover, the data voltage polarities of every two sub-pixels adjacent in the row direction D1 are also opposite to each other as much as possible. This facilitates cancellation of the coupling voltages on the common electrode caused by the data voltages on different sub-pixels, thereby alleviating or eliminating the display defects.

In an alternative embodiment, a first sub-pixel 201 that is a red sub-pixel and a third sub-pixel 203 that is a blue sub-pixel may be disposed in the second column (more generally, the (8j+2)-th column) of sub-pixels and the sixth column (more generally, the (8j+6)-th column) of sub-pixels, in view of the fact that the human eyes are less sensitive to red and blue as compared to green and white. In this way, no perceptible display defects will be brought about even if these columns of sub-pixels have data voltage polarities that do not alternate.

Figure 5:
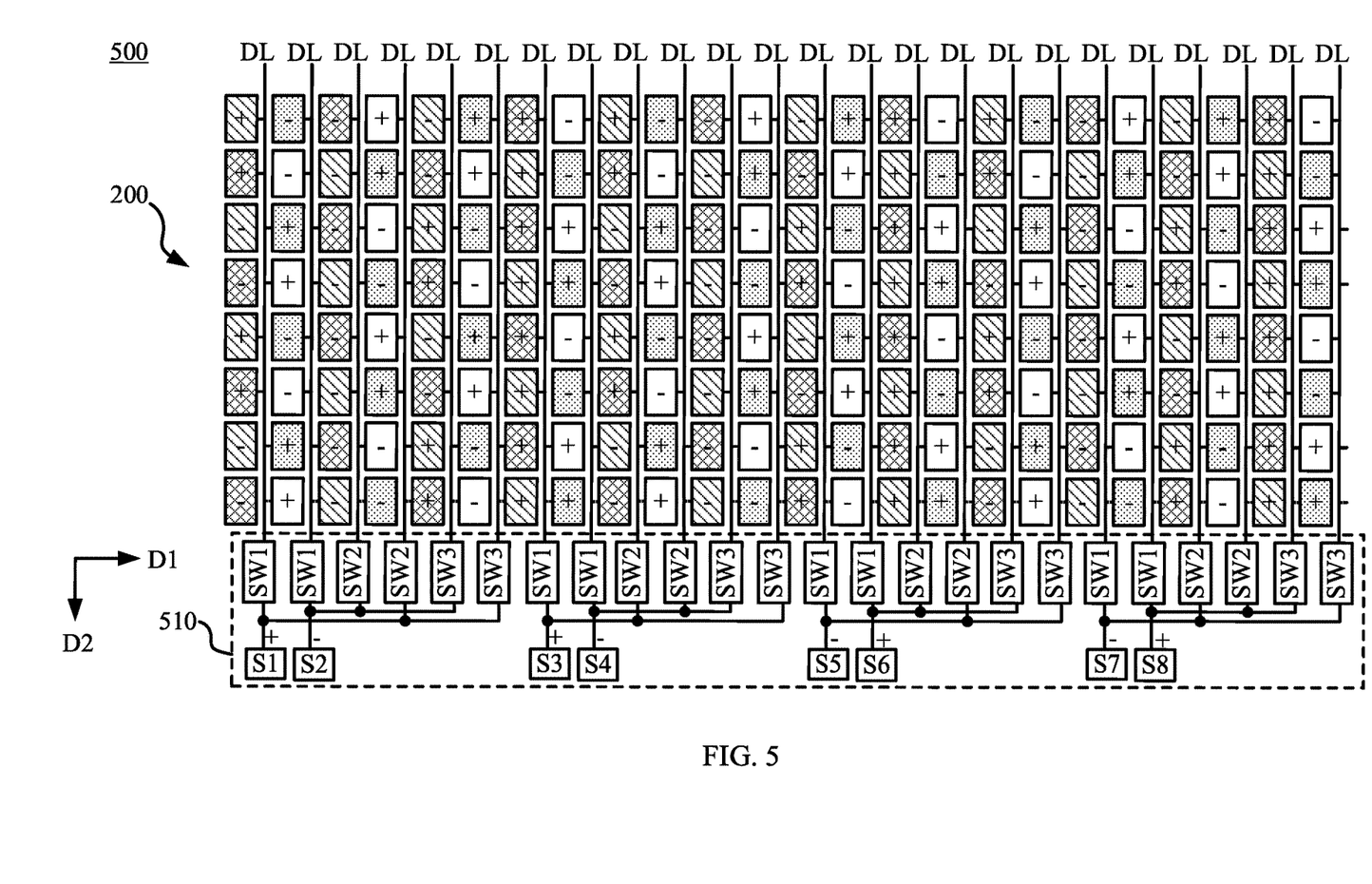
FIG. 5 is a schematic plan view of a display panel according to an embodiment of the present disclosure.

FIG. 5 is a schematic plan view of a display panel 500 according to an embodiment of the present disclosure.

Referring to FIG. 5, the display panel 500 includes the pixel arrangement structure 200 as described above with respect to FIG. 2, and details thereof will not be repeated here. The display panel 500 further includes a plurality of data lines DL extending in the column direction D2. For convenience of illustration, other known elements in the display panel 500, such as the gate lines extending in the row direction D1, the pixel transistors located at the intersection of the gate lines and the data lines, and the storage capacitors associated with respective sub-pixels, are not shown.

The display panel 500 further includes a plurality of data selectors, which are collectively indicated by a reference numeral 510. These data selectors 510 are located at the same end of the plurality of data lines DL and are configured to transmit data voltages to respective ones of the plurality of data lines DL. The data selectors are known per se in the art. A data selector typically includes a data input terminal, a plurality of data output terminals, and a plurality of switches that couple the data input terminal to respective ones of the plurality of data output terminals. The data selector may be controlled such that the plurality of switches are sequentially switched on to transmit multiplexed data received at the data input terminal to the respective data output terminals. In this way, the number of source driver chips that supply data voltages to the display panel 500 can be reduced, which may be advantageous in some applications, for example, to reduce the footprint of the bezel of the display panel, or to reduce the costs.

In this embodiment, the plurality of data selectors 510 include a plurality of three-to-one data selectors, each of which includes a data input terminal Sx (x=1, 2, 3, 4, 5, 6, 7, or 8 in the example of FIG. 5), three data output terminals, and three switches SW1, SW2 and SW3 that couple the data input terminal to respective ones of the three data output terminals.

In this embodiment, the connections between the plurality of data selectors 510 and the plurality of data lines DL are repeated at an interval of 24 data lines. Specifically, the three data output terminals SW1, SW2 and SW3 of a (8k+1)-th one of the plurality of three-to-one data selectors 510 (k being an integer greater than or equal to 0, k≤(n−5)/6) are respectively connected to the (24k+1)-th, (24k+4)-th, and (24k+6)-th ones of the plurality of data lines DL. The three data output terminals SW1, SW2 and SW3 of a (8k+2)-th one of the plurality of three-to-one data selectors 510 are respectively connected to the (24k+2)-th, (24k+3)-th and (24k+5)-th ones of the plurality of data lines DL. The three data output terminals SW1, SW2 and SW3 of a (8k+3)-th one of the plurality of three-to-one data selectors 510 are respectively connected to the (24k+7)-th, (24k+9)-th and (24k+12)-th ones of the plurality of data lines DL. The three data output terminals SW1, SW2 and SW3 of a (8k+4)-th one of the plurality of three-to-one data selectors 510 are respectively connected to the (24k+8)-th, (24k+10)-th and (24k+11)-th ones of the plurality of data lines DL. The three data output terminals SW1, SW2 and SW3 of a (8k+5)-th one of the plurality of three-to-one data selectors 510 are respectively connected to the (24k+13)-th, (24k+16)-th and (24k+18)-th ones of the plurality of data lines DL. The three data output terminals SW1, SW2 and SW3 of a (8k+6)-th three-select one-data selectors in the plurality of three-select one-data selectors 510 are respectively connected to the (24k+14)-th, (24k+15)-th and (24k+17)-th ones of the plurality of data lines DL. The three data output terminals SW1, SW2 and SW3 of a (8k+7)-th one of the plurality of three-to-one data selectors 510 are respectively connected to the (24k+19)-th, (24k+21)-th and (24k+24)-th ones of the plurality of data lines DL. The three data output terminals SW1, SW2 and SW3 of a (8k+8)-th one of the plurality of three-to-one data selectors 510 are respectively connected to the (24k+20)-th, (24k+22)-th and (24k+23)-th ones of the plurality of data lines DL.

In this embodiment, the data input terminals of the (8k+1)-th, (8k+3)-th, (8k+6)-th, and (8k+8)-th ones of the plurality of three-to-one data selectors 510 are configured to receive data voltages of a first polarity (e.g., a positive polarity) in a frame period, and the data input terminals of the (8k+2)-th, (8k+4)-th, (8k+5)-th, (8k+7)-th ones of the plurality of three-to-one data selectors 510 are configured to receive data voltages of a second polarity (e.g., a negative polarity) in the frame period. The second polarity is opposite to the first polarity. This can produce a data voltage polarity pattern as shown in FIG. 3.

Figure 6:
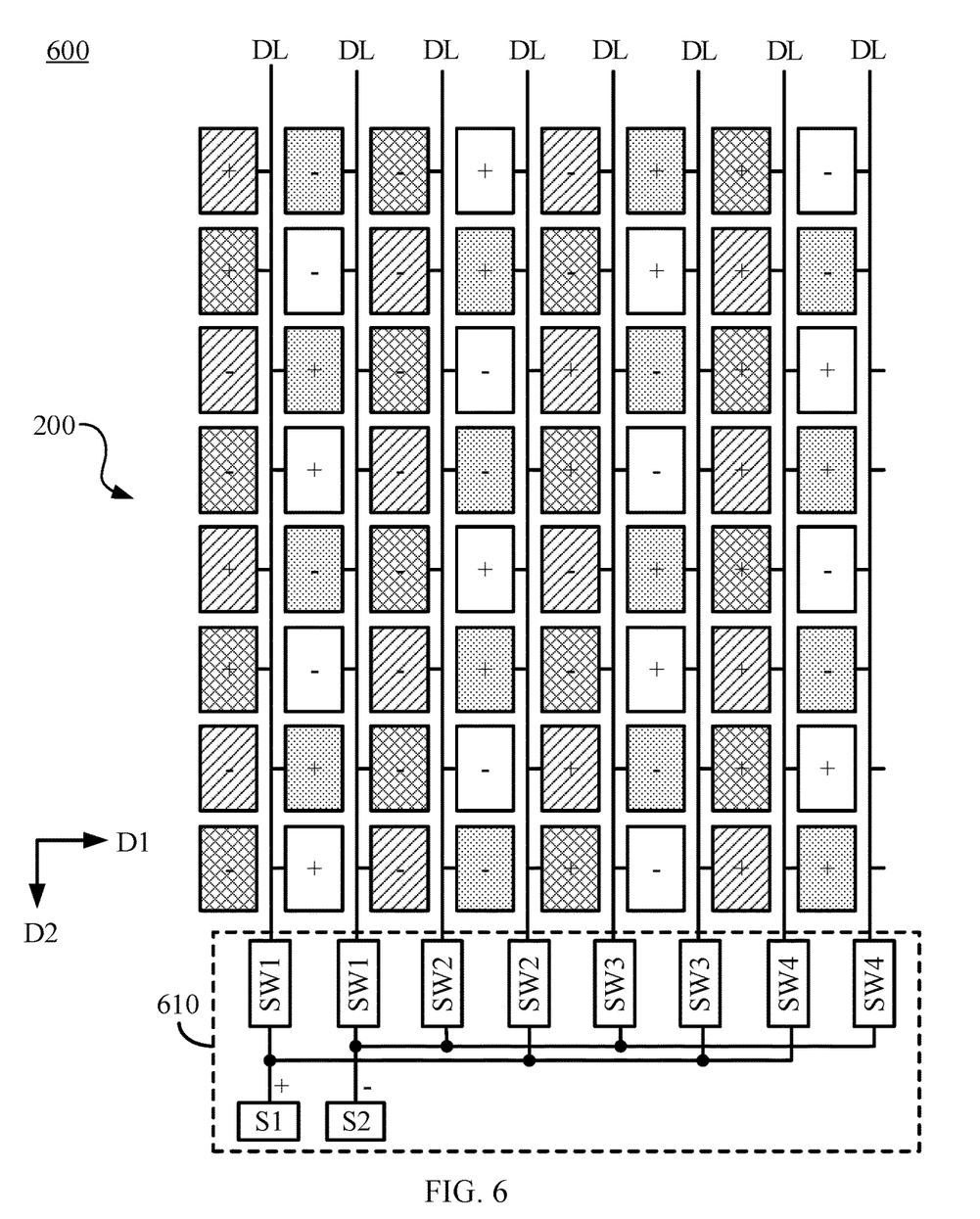
FIG. 6 is a schematic plan view of a display panel according to another embodiment of the present disclosure.

FIG. 6 is a schematic plan view of a display panel 600 according to another embodiment of the present disclosure.

Referring to FIG. 6, the display panel 600 includes the pixel arrangement structure 200 as described above with respect to FIG. 2, and details thereof will not be repeated here. The display panel 600 further includes a plurality of data lines DL extending in the column direction D2. Similar to FIG. 5, for the convenience of illustration, other known elements in the display panel 600, such as the gate lines extending in the row direction D1, the pixel transistors located at the intersections of the gate lines and the data lines, and respective storage capacitors associated with respective sub-pixels, are not shown.

In this embodiment, the display panel 600 further includes a plurality of data selectors, which are collectively indicated by a reference numeral 610.

In this embodiment, the plurality of data selectors 610 include a plurality of four-to-one data selectors, each of which includes a data input terminal Sx (x=1 or 2 in the example of FIG. 6), four data output terminals, and four switches SW1, SW2, SW3 and SW4 that couple the data input terminal to respective ones of the four data output terminals.

In this embodiment, the connections between the plurality of data selectors 610 and the plurality of data lines DL are repeated at an interval of eight data lines. Specifically, the four data output terminals SW1, SW2, SW3 and SW4 of a (2k+1)-th one of the plurality of four-to-one data selectors 610 (k being an integer greater than or equal to 0, k $\leq$ (n−1)/2) are respectively connected to the (8k+1)-th, (8k+4)-th, (8k+6)-th, and (8k+7)-th ones of the plurality of data lines DL, and the four data output terminals SW1, SW2, SW3 and SW4 of a (2k+2)-th one of the plurality of four-to-one data selectors 610 are respectively connected to the (8k+2)-th, (8k+3)-th, (8k+5)-th, and (8k+8)-th ones of the plurality of data lines DL.

In this embodiment, the data input terminal of the (2k+1)-th one of the plurality of four-to-one data selectors 610 is configured to receive a data voltage of a first polarity (e.g. a positive polarity) in a frame period, and the data input terminal of the (2k+2)-th one of the plurality of four-to-one data selectors 610 is configured to receive a data voltage of a second polarity (e.g., a negative polarity) in the frame period. The second polarity is opposite to the first polarity. This can produce a data voltage polarity pattern as shown in FIG. 3.

Figure 7:
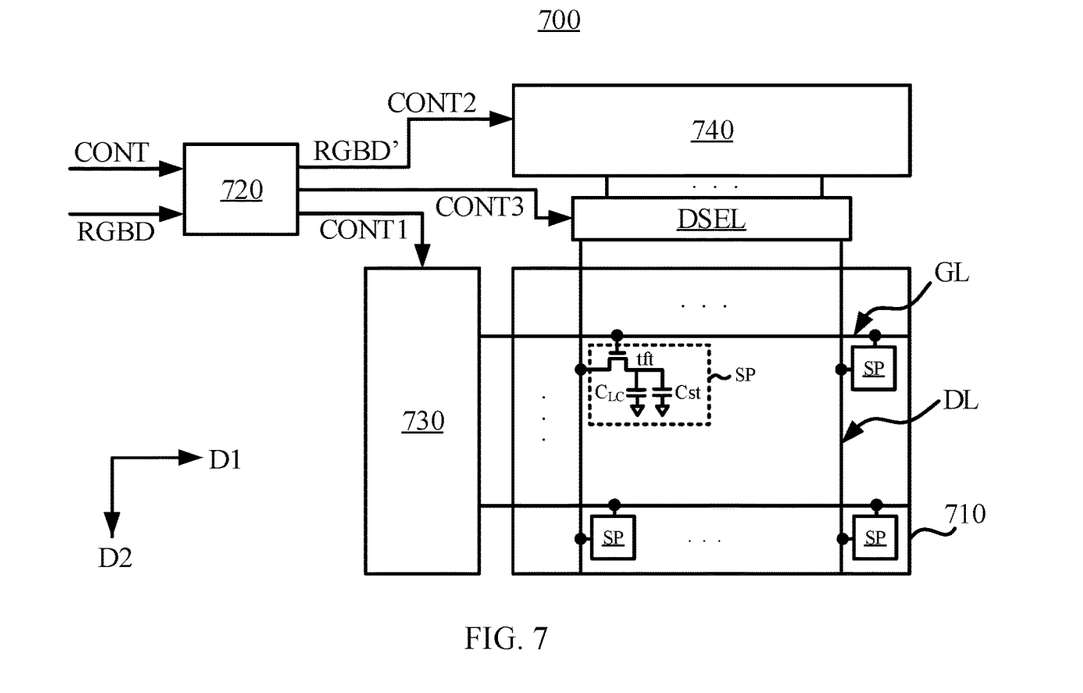
FIG. 7 is a schematic block diagram of a display apparatus according to an embodiment of the present disclosure.

FIG. 7 is a schematic block diagram of a display apparatus 700 according to an embodiment of the present disclosure.

Referring to FIG. 7, the display apparatus 700 includes a display panel 710, a timing controller 720, a gate driver 730, a data driver 740, and a data selection circuit DSEL.

The display panel 710 is connected to a plurality of gate lines GL and a plurality of data lines DL. The gate lines GL extend in a row direction D1, and the data lines DL extend in a column direction D2 intersecting (e.g., substantially perpendicular to) the row direction D1.

The display panel 710 includes a plurality of sub-pixels SP arranged in a matrix. Each of the sub-pixels SP is electrically connected to a corresponding one of the gate lines GL and a corresponding one of the data lines DL. Each sub-pixel SP includes a pixel transistor tft (e.g., a thin film transistor), a liquid crystal capacitor $C_{LC}$, and a storage capacitor Cst. The liquid crystal capacitor $C_{LC}$ and the storage capacitor Cst are electrically connected to the pixel transistor tft. The liquid crystal capacitor $C_{LC}$ includes a first electrode connected to a pixel electrode and a second electrode connected to a common electrode. A data voltage from the data line DL is applied to the first electrode of the liquid crystal capacitor $C_{LC}$ via the pixel transistor tft. A common voltage is applied to the second electrode of the liquid crystal capacitor $C_{LC}$. The storage capacitor Cst includes a first electrode connected to the pixel electrode and a second electrode connected to a storage electrode. The data voltage is applied to the first electrode of the storage capacitor Cst via the pixel transistor tft. A storage voltage is applied to the second electrode of the storage capacitor Cst. The storage voltage may be substantially equal to the common voltage.

The display panel 710 embodies the display panel 500 or 600 described above with respect to FIGS. 5 and 6. Each pixel SP has a substantially rectangular shape. For example, each pixel SP has a relatively short side in the row direction D1 and a relatively long side in the column direction D2. The relatively short side of each pixel SP is substantially parallel to the gate lines GL. The relatively long side of each pixel SP is substantially parallel to the data lines DL. The display panel 710 further includes a data selection circuit DSEL, which embodies the plurality of data selectors 510 or 610 described above with respect to FIGS. 5 and 6, and the details thereof will not be repeated here.

The timing controller 720 controls operations of the display panel 710, the gate driver 730, the data driver 740, and the data selection circuit DSEL. The timing controller 720 receives input image data RGBD and input control signals CONT from a system interface. The input image data RGBD includes a plurality of input pixel data for the plurality of sub-pixels SP. The input control signals CONT may include a main clock signal, a data enable signal, a vertical synchronization signal, a horizontal synchronization signal, and the like. The timing controller 720 generates output image data RGBD', a first control signal CONT1, a second control signal CONT2, and a third control signal CONT3 based on the input image data RGBD and the input control signal CONT. For example, the timing controller 720 may generate output image data RGBD' based on the input image data RGBD. In some embodiments, the output image data RGBD' may be image data generated by converting the original format of the input image data RGBD to fit the pixel arrangement structure of the display panel 710. The output image data RGBD' may include a plurality of output pixel data for the plurality of sub-pixels SP. The timing controller 720 generates the first control signal CONT1 based on the input control signal CONT. The first control signal CONT1 may include a vertical start signal, a gate clock signal, and the like. The timing controller 720 generates the second control signal CONT2 based on the input control signal CONT. The second control signal CONT2 may include a horizontal start signal, a data clock signal, a data load signal, a polarity control signal, and the like. The timing controller 720 generates the third control signal CONT3 based on the input control signal CONT, which is supplied to the data selection circuit DSEL to control a plurality of switches in the data selection circuit DSEL to operate in synchronization with the gate driver 730 and the data driver 740.

The gate driver 730 receives the first control signal CONT1 from the timing controller 720, and generates a plurality of gate signals for driving the gate lines GL based on the first control signal CONT1. The gate driver 730 sequentially applies the plurality of gate signals to the gate lines GL. In some exemplary embodiments, the gate driver 730 is integrated in the display panel 710 as a gate-driver-on-array (GOA) circuit. Alternatively, the gate driver 730 is connected to the display panel 710 through a tape carrier package (TCP).

The data driver 740 receives the second control signal CONT2 and the output image data RGBD' from the timing controller 720, and generates a plurality of data voltages based on the second control signal CONT2 and the output image data RGBD'. The data driver 740 operates in synchronization with the gate driver 730 to apply the plurality of data voltages to the data lines DL. In some exemplary embodiments, the data driver 740 includes a shift register, a latch, a digital-to-analog converter, and a buffer. The shift register outputs a latch pulse to the latch. The latch temporarily stores the output image data RGBD' and outputs the output image data RGBD' to the digital-to-analog converter. The digital-to-analog converter generates analog data voltages based on the output image data RGBD', and outputs the analog data voltages to the buffer. The buffer outputs the analog data voltages to the data lines DL.

Depending on the implementation of the data selection circuit DSEL (e.g., a set of three-to-one data selectors or four-to-one data selectors), each of the data lines DL carries respective multiplexed (three or four) data voltages in each horizontal scan period. In response to the third control signal CONT3, the data selection circuit DSEL transmits the multiplexed multiple data voltages to corresponding ones of the plurality of sub-pixels SP in each horizontal scan period.

The display apparatus 700 may be any product or component having a display function, examples of which include, but are not limited to, a mobile phone, a tablet computer, a television, a display, a notebook computer, a digital photo frame, a navigator, and the like. The display apparatus 700 provides the same advantages as the embodiments of the pixel arrangement structure described above, which will not be repeated here.

Various modifications and variations can be made by those skilled in the art to the present disclosure without departing from the scope of the present disclosure. If these modifications and variations of the present disclosure fall within the scope of the claims of the present disclosure and equivalents thereof, the present disclosure also intends to include these modifications and variations.

The invention claimed is:

1. A display panel comprising:
a pixel arrangement structure, the pixel arrangement structure comprising a plurality of pixel repeating units and a plurality of data lines, the plurality of pixel repeating units being arranged in a matrix in a row direction and a column direction, each of the plurality of pixel repeating units comprising a first pixel unit and a second pixel unit sequentially arranged in the column direction, the first pixel unit comprising a first sub-pixel, a second sub-pixel, a third sub-pixel, and a fourth sub-pixel sequentially arranged in the row direction, and the second pixel unit comprising a third sub-pixel, a fourth sub-pixel, a first sub-pixel, and a second sub-pixel sequentially arranged in the row direction; and the plurality of data lines extending in the column direction, wherein the first sub-pixel in a $(4m+1)$-th row and a $(4n+1)$-th column, the third sub-pixel in a $(4m+2)$-th row and the $(4n+1)$-th column, the second sub-pixel in a $(4m+3)$-th row and a $(4n+2)$-th column, and the fourth sub-pixel in a $(4m+4)$-th row and the $(4n+2)$-th column are connected to a $(4n+1)$-th one of the plurality of data lines, the second sub-pixel in the $(4m+1)$-th row and the $(4n+2)$-th column, the fourth sub-pixel in the $(4m+2)$-th row and the $(4n+2)$-th column, the third sub-pixel in the $(4m+3)$-th row and a $(4n+3)$-th column, and the first sub-pixel in the $(4m+4)$-th row and the $(4n+3)$-th column are connected to a $(4n+2)$-th one of the plurality of data lines, the third sub-pixel in the $(4m+1)$-th row and the $(4n+3)$-th column, the first sub-pixel in the $(4m+2)$-th row and the $(4n+3)$-th column, the fourth sub-pixel in the $(4m+3)$-th row and a $(4n+4)$-th column, and the second sub-pixel in the $(4m+4)$-th row and the $(4n+4)$-th column are connected to a $(4n+3)$-th one of the plurality of data lines, the fourth sub-pixel in the $(4m+1)$-th row and the $(4n+4)$-th column, the second sub-pixel in the $(4m+2)$-th row and the $(4n+4)$-th column, the first sub-pixel in the $(4m+3)$-th row and a $(4n+5)$-th column, and the third sub-pixel in the $(4m+4)$-th row and the $(4n+5)$-th column are connected to a $(4n+4)$-th one of the plurality of data lines, and wherein m and n are integers greater than or equal to 0; and
a plurality of data selectors at a same end of the plurality of data lines and configured to transmit data voltages to respective ones of the plurality of data lines, wherein the plurality of data selectors comprise a plurality of three-to-one data selectors, and wherein each of the three-to-one data selectors comprises a data input terminal and three data output terminals,
wherein the three data output terminals of a $(8k+1)$-th one of the plurality of three-to-one data selectors are respectively connected to $(24k+1)$-th, $(24k+4)$-th and $(24k+6)$-th ones of the plurality of data lines,
wherein the three data output terminals of a $(8k+2)$-th one of the plurality of three-to-one data selectors are respectively connected to $(24k+2)$-th, $(24k+3)$-th and $(24k+5)$-th ones of the plurality of data lines, wherein the three data output terminals of a (8k+3)-th one of the plurality of three-to-one data selectors are respectively connected to (24k+7)-th, (24k+9)-th and (24k+12)-th ones of the plurality of data lines, wherein the three data output terminals of a (8k+4)-th one of the plurality of three-to-one data selectors are respectively connected to (24k+8)-th, (24k+10)-th and (24k+11)-th ones of the plurality of data lines, wherein the three data output terminals of a (8k+5)-th one of the plurality of three-to-one data selectors are respectively connected to (24k+13)-th, (24k+16)-th and (24k+18)-th ones of the plurality of data lines, wherein the three data output terminals of a (8k+6)-th one of the plurality of three-to-one data selectors are respectively connected to (24k+14)-th, (24k+15)-th and (24k+17)-th ones of the plurality of data lines, wherein the three data output terminals of a (8k+7)-th one of the plurality of three-to-one data selectors are respectively connected to (24k+19)-th, (24k+21)-th and (24k+24)-th ones of the plurality of data lines, wherein the three data output terminals of a (8k+8)-th one of the plurality of three-to-one data selectors are respectively connected to (24k+20)-th, (24k+22)-th and (24k+23)-th ones of the plurality of data lines, and wherein k is an integer greater than or equal to 0, and $k \leq (n-5)/6$.

2. The display panel of claim 1, wherein data input terminals of the (8k+1)-th, (8k+3)-th, (8k+6)-th and (8k+8)-th ones of the plurality of three-to-one data selectors are configured to receive data voltages of a first polarity in a frame period, wherein data input terminals of the (8k+2)-th, (8k+4)-th, (8k+5)-th and (8k+7)-th ones of the plurality of three-to-one data selectors are configured to receive data voltages of a second polarity in the frame period, and wherein the second polarity is opposite to the first polarity.

3. A display apparatus comprising the display panel of claim 1.

4. The display apparatus of claim 3, wherein the first sub-pixel, the second sub-pixel, the third sub-pixel, and the fourth sub-pixel are respective different ones selected from a red sub-pixel, a green sub-pixel, a blue sub-pixel, and a white sub-pixel.

5. The display panel of claim 1, wherein the first sub-pixel, the second sub-pixel, the third sub-pixel, and the fourth sub-pixel are respective different ones selected from a red sub-pixel, a green sub-pixel, a blue sub-pixel, and a white sub-pixel.

6. A display panel comprising:

a pixel arrangement structure, the pixel arrangement structure comprising a plurality of pixel repeating units and a plurality of data lines, the plurality of pixel repeating units being arranged in a matrix in a row direction and a column direction, each of the plurality of pixel repeating units comprising a first pixel unit and a second pixel unit sequentially arranged in the column direction, the first pixel unit comprising a first sub-pixel, a second sub-pixel, a third sub-pixel, and a fourth sub-pixel sequentially arranged in the row direction, and the second pixel unit comprising a third sub-pixel, a fourth sub-pixel, a first sub-pixel, and a second sub-pixel sequentially arranged in the row direction; and the plurality of data lines extending in the column direction, wherein the first sub-pixel in a (4m+1)-th row and a (4n+1)-th column, the third sub-pixel in a (4m+2)-th row and the (4n+1)-th column, the second sub-pixel in a (4m+3)-th row and a (4n+2)-th column, and the fourth sub-pixel in a (4m+4)-th row and the (4n+2)-th column are connected to a (4n+1)-th one of the plurality of data lines, the second sub-pixel in the (4m+1)-th row and the (4n+2)-th column, the fourth sub-pixel in the (4m+2)-th row and the (4n+2)-th column, the third sub-pixel in the (4m+3)-th row and a (4n+3)-th column, and the first sub-pixel in the (4m+4)-th row and the (4n+3)-th column are connected to a (4n+2)-th one of the plurality of data lines, the third sub-pixel in the (4m+1)-th row and the (4n+3)-th column, the first sub-pixel in the (4m+2)-th row and the (4n+3)-th column, the fourth sub-pixel in the (4m+3)-th row and a (4n+4)-th column, and the second sub-pixel in the (4m+4)-th row and the (4n+4)-th column are connected to a (4n+3)-th one of the plurality of data lines, the fourth sub-pixel in the (4m+1)-th row and the (4n+4)-th column, the second sub-pixel in the (4m+2)-th row and the (4n+4)-th column, the first sub-pixel in the (4m+3)-th row and a (4n+5)-th column, and the third sub-pixel in the (4m+4)-th row and the (4n+5)-th column are connected to a (4n+4)-th one of the plurality of data lines, and wherein m and n are integers greater than or equal to 0; and a plurality of data selectors at a same end of the plurality of data lines and configured to transmit data voltages to respective ones of the plurality of data lines, wherein the plurality of data selectors comprise a plurality of four-to-one data selectors, wherein each of the four-to-one data selectors comprises a data input terminal and four data output terminals, wherein the four data output terminals of a (2k+1)-th one of the plurality of four-to-one data selectors are respectively connected to (8k+1)-th, (8k+4)-th, (8k+6)-th and (8k+7)-th ones of the plurality of data lines, wherein the four data output terminals of a (2k+2)-th one of the plurality of four-to-one data selectors are respectively connected to (8k+2)-th, (8k+3)-th, (8k+5)-th and (8k+8)-th ones of the plurality of data lines, and wherein k is an integer greater than or equal to 0, and $k \leq (n-1)/2$.

7. The display panel of claim 6, wherein the data input terminal of the (2k+1)-th one of the plurality of four-to-one data selectors is configured to receive data voltages of a first polarity in a frame period, wherein the data input terminal of the (2k+2)-th one of the plurality of four-to-one data selectors is configured to receive data voltages of a second polarity in the frame period, and wherein the second polarity is opposite to the first polarity.

8. A display apparatus comprising the display panel of claim 6.

9. The display apparatus of claim 8, wherein the first sub-pixel, the second sub-pixel, the third sub-pixel, and the fourth sub-pixel are respective different ones selected from a red sub-pixel, a green sub-pixel, a blue sub-pixel, and a white sub-pixel.

10. A method of driving a pixel arrangement structure, the pixel arrangement structure comprising a plurality of pixel repeating units and a plurality of data lines, the plurality of pixel repeating units being arranged in a matrix in a row direction and a column direction, each of the plurality of pixel repeating units comprising a first pixel unit and a second pixel unit sequentially arranged in the column direction, the first pixel unit comprising a first sub-pixel, a second sub-pixel, a third sub-pixel, and a fourth sub-pixel sequentially arranged in the row direction, and the second pixel unit comprising a third sub-pixel, a fourth sub-pixel, a first sub-pixel, and a second sub-pixel sequentially arranged in the row direction; and the plurality of data lines extending in the column direction,     wherein the first sub-pixel in a (4m+1)-th row and a (4n+1)-th column, the third sub-pixel in a (4m+2)-th row and the (4n+1)-th column, the second sub-pixel in a (4m+3)-th row and a (4n+2)-th column, and the fourth sub-pixel in a (4m+4)-th row and the (4n+2)-th column are connected to a (4n+1)-th one of the plurality of data lines, the second sub-pixel in the (4m+1)-th row and the (4n+2)-th column, the fourth sub-pixel in the (4m+2)-th row and the (4n+2)-th column, the third sub-pixel in the (4m+3)-th row and a (4n+3)-th column, and the first sub-pixel in the (4m+4)-th row and the (4n+3)-th column are connected to a (4n+2)-th one of the plurality of data lines, the third sub-pixel in the (4m+1)-th row and the (4n+3)-th column, the first sub-pixel in the (4m+2)-th row and the (4n+3)-th column, the fourth sub-pixel in the (4m+3)-th row and a (4n+4)-th column, and the second sub-pixel in the (4m+4)-th row and the (4n+4)-th column are connected to a (4n+3)-th one of the plurality of data lines, the fourth sub-pixel in the (4m+1)-th row and the (4n+4)-th column, the second sub-pixel in the (4m+2)-th row and the (4n+4)-th column, the first sub-pixel in the (4m+3)-th row and a (4n+5)-th column, and the third sub-pixel in the (4m+4)-th row and the (4n+5)-th column are connected to a (4n+4)-th one of the plurality of data lines, and wherein m and n are integers greater than or equal to 0, the method comprising:

applying respective data voltages to the data lines according to a first data voltage polarity pattern and a second data voltage polarity pattern in a frame period, such that two of the pixel repeating units adjacent in the row direction have opposite data voltage polarity patterns,     wherein the first data voltage polarity pattern is that sub-pixels in a (4i+1)-th row and (8j+1)-th to (8j+4)-th columns respectively have data voltages of a first polarity, a second polarity, the second polarity, and the first polarity, sub-pixels in a (4i+2)-th row and the (8j+1)-th to (8j+4)-th columns respectively have data voltages of the first polarity, the second polarity, the second polarity, and the first polarity, sub-pixels in a (4i+3)-th row and the (8j+1)-th to (8j+4)-th columns respectively have data voltages of the second polarity, the first polarity, the second polarity, and the second polarity, and sub-pixels in a (4i+4)-th row and the (8j+1)-th to (8j+4)-th columns respectively have data voltages of the second polarity, the first polarity, the second polarity, and the second polarity,   wherein the second data voltage polarity pattern is that sub-pixels in a (4i+1)-th row and (8j+1)-th to (8j+4)-th columns respectively have data voltages of a first polarity, the first polarity, a second polarity, and the first polarity, sub-pixels in a (4i+2)-th row and the (8j+1)-th to (8j+4)-th columns respectively have data voltages of the first polarity, the first polarity, the second polarity, and the first polarity, sub-pixels in a (4i+3)-th row and the (8j+1)-th to (8j+4)-th columns respectively have data voltages of the second polarity, the first polarity, the first polarity, and the second polarity, sub-pixels in a (4i+4)-th row and the (8j+1)-th to (8j+4)-th columns respectively have data voltages of the second polarity, the first polarity, the first polarity, and the second polarity, and   wherein i and j are integers greater than or equal to 0, i≤m, and j≤n/2.

11. The method of claim 10, wherein the first polarity and the second polarity are respective different polarities selected from a positive polarity and a negative polarity.

\* \* \* \* \*